2,721,114

SOLUTIONS OF POLYACRYLONITRILE AND ACRYLONITRILE COPOLYMERS IN MIXTURES OF FORMIC ACID, OXALIC ACID, AND WATER

John Downing, Arthur Hodge, and James Gordon Napier Drewitt, Spondon, near Derby, England, assignors to British Celanese Limited, a corporation of Great Britain No Drawing. Original application June 14, 1951, Serial No. 231,665. Divided and this application February 1, 1954, Serial No. 407,579

Claims priority, application Great Britain June 29, 1950

8 Claims. (Cl. 18—54)

This invention relates to solutions of polyacrylonitrile and of copolymers containing acrylonitrile as the preponderating constituent, and to the production from such solutions of shaped articles such as fibres and films, and is a divisional application of our copending application Ser. No. 231,665.

A class of polymer of increasing importance consists of polyacrylonitrile and copolymers of acrylonitrile with other unsaturated compounds, especially monovinyl compounds. Examples of such other unsaturated compounds are: substituted acrylonitriles, e. g. methacrylonitrile; vinyl esters, e. g. vinyl chloride and vinyl acetate; acrylic acid derivatives, e. g. methyl acrylate and phenyl acrylate; styrene and its derivatives; and vinylidene chloride. Polyacrylonitrile itself and such copolymers with other unsaturated compounds as contain a preponderating proportion of acrylonitrile are in the present specification referred to as acrylonitrile polymers. It is well known that acrylonitrile polymers, especially such as have fibre-forming properties, are in many cases insoluble in the organic liquids commonly employed as solvents, and that this constitutes a considerable difficulty in the way of utilising these polymers.

We have now found that acrylonitrile polymers, especially such as are fibre-forming, can be dissolved in solvents consisting of mixtures of formic acid, oxalic acid, and water, preferably mixtures containing 20–40% of formic acid, 60–45% of oxalic acid, and 25–10% of water, all proportions being by weight.

The invention is of particular value in the formation and use of solutions of polyacrylonitrile itself, and of such copolymers of acrylonitrile and other unsaturated compounds as are insoluble in acetone. Examples of such copolymers are copolymers containing 85% or more of acrylonitrile and 15% or less of vinyl chloride, or 60% or more of acrylonitrile and 40% or less of methacrylonitrile. Such copolymers are as a rule easier or at least no more difficult to dissolve in the solvents of the invention than is polyacrylonitrile itself, and it will therefore be convenient in describing the invention in more detail to refer specifically to polyacrylonitrile.

The polyacrylonitrile may be dissolved in the solvent by adding it to the required amount of the solvent and heating the mixture of polymer and solvent, usually to a temperature between about 80° or 90° and 120° C.; the use of temperatures above 120° C., e. g. up to about 190° C., may however sometimes be advantageous, especially when it is desired to obtain a solution of high concentration, e. g. a solution containing 20–25% of polyacrylonitrile.

More rapid solution of the polyacrylonitrile may often be achieved by adding the polyacrylonitrile to formic acid alone or aqueous formic acid in the first place, heating the mixture for example to between 90° and 120° C., and then adding oxalic acid, and if necessary water, and stirring until a clear solution has been formed. The oxalic acid is preferably first heated to about the same temperature as the polyacrylonitrile and formic acid or aqueous formic acid. Again, if desired the solvent mixture as a whole may be heated, for example to 90° C. or higher, before the polyacrylonitrile is added.

When temperatures are used at or above the boiling point of the solvent mixture, a closed vessel capable of withstanding the pressure developed must of course be employed. The solutions once formed, especially solutions of concentration below about 25%, and more particularly about 20% or lower, can in general be cooled considerably without undergoing immediate gelling, though in some cases the cooled solutions may gel if left to stand for a fairly long time.

When the solutions are to be used for the production of shaped articles such as fibres and films by extrusion or casting methods, it is preferable that the viscosity of the polyacrylonitrile or other acrylonitrile polymer (measured in 1% solution in dimethyl formamide at 20° C.) should be between about 2.5 and 4 centistokes, and especially between about 3 and 3.5 centistokes. The concentration of the solution is preferably between about 5% and 25%, and especially 7.5–20%, concentrations of 10–20% being particularly useful.

The shaped articles may be made by a wet-spinning or wet-casting method, preferably using as the coagulating liquid a carboxylic acid ester of boiling point above 250° C., especially a dialkyl phthalate, as described in application Ser. No. 257,198, filed November 19, 1951, of J. Downing and J. G. N. Drewitt. The polymer solution and coagulating liquid may be at room temperature, but it is usually better that the polymer solution should be at an elevated temperature, especially between about 60° or 70° C. and its boiling point, and that the coagulating liquid should be heated to a temperature approximately equal to or slightly higher than that of the polymer solution.

Fibres made in accordance with the invention are preferably oriented by stretching in order to increase their tenacity. A certain degree of stretch may be imparted to the fibres in the course of the spinning operation, but whether this is done or not the fibres are preferably stretched by several times, e. g. by 5–15 times, their length in a subsequent operation. For example wet-spun fibres, after leaving the coagulating bath, may be wound up and washed (e. g. in the form of multi-filament yarns), and then stretched while heated; for example they may be stretched in hot air, wet steam, or water at a temperature above 80° C., or while they are passed in contact with a hot metal surface, e. g. the surface of a plate or roller kept at about 120°–150° C. To obtain a yarn of the highest tenacity it is advantageous to stretch the fibres as soon as possible after coagulating is complete; for example they may be stretched continuously with their formation, if desired after an intermediate wash with water. If the separate filaments in a multi-filament yarn show any tendency to stick together or coalesce during the stretching operation, this can generally be prevented by passing the yarn through an aqueous oil emulsion, or otherwise applying an aqueous oil emulsion to the yarn, before it is heated and stretched, or by carrying out the stretching operation in an aqueous oil emulsion at an elevated temperature, especially at a temperature above 80° C. After being stretched the fibres may be treated to increase their extensibility by heating them, e. g. to about 140°–200° C., in the absence of tension until no more shrinkage takes place.

Films and like articles made in accordance with the invention may also be stretched to increase their tenacity.

While the solutions of the invention are of particular value in the production of fibres and films and like shaped articles by extrusion or casting methods, they may also be employed for other purposes, e. g. for the production of coatings of acrylonitrile polymers.

The invention is further illustrated by the following example.

*Example*

A polyacrylonitrile made by polymerising acrylonitrile in 18 times its weight of water using as catalyst ammonium persulphate, and having a viscosity (in a 1% dimethyl formamide solution at 20° C.) of about 3.25 centistokes, was heated to about 90° C. with 6 times its weight of a mixture of formic acid (30% by weight), oxalic acid (55% by weight) and water (15% by weight). A clear solution was obtained which could be cooled to a considerable extent without gelling.

Having described our invention, what we desire to secure by Letters Patent is:

1. Compositions comprising a fibre-forming polymer derived from at least one monovinyl monomer and containing more than 85% by weight of acrylonitrile, dissolved in a mixture of 20–40% by weight of formic acid, 60–45% by weight of oxalic acid, and 25–10% by weight of water.

2. Compositions comprising a fibre-forming polyacrylonitrile dissolved in a mixture of 20–40% by weight of formic acid, 60–45% by weight of oxalic acid, and 25–10% by weight of water.

3. Compositions according to claim 1, wherein the viscosity of the polymer, measured in 1% solution in di-methyl-formamide at 20° C., is 2.5–4.0 centistokes, and its concentration in the composition is 7.5–20%.

4. Process for the production of a solution of a polymer derived from at least one monovinyl monomer and containing more than 85% of acrylonitrile, which comprises maintaining the polymer in contact with a mixture of 20–40% by weight of formic acid, 60–45% by weight of oxalic acid, and 25–10% by weight of water at a temperature of 80–120° C. until a clear homogeneous solution has been formed.

5. Process according to claim 4, wherein the polymer has a viscosity, measured in 1% solution in dimethyl-formamide at 20° C., of 2.5–4.0 centistokes, and is dissolved in 4–12.5 times its weight of the mixture of formic acid, oxalic acid and water.

6. Process for the manufacture of shaped articles such as fibres and films, which comprises shaping a composition claimed in claim 1 and coagulating the polymer by means of a coagulating liquid.

7. Process for the manufacture of shaped articles such as fibres and films, which comprises shaping at a temperature above 70° C. a composition claimed in claim 3, and coagulating the polymer by means of a coagulating liquid which is also at a temperature above 70° C.

8. Process according to claim 7, wherein the polymer is coagulated by means of a carboxylic acid ester of boiling point above 250° C.

References Cited in the file of this patent

UNITED STATES PATENTS

| | | |
|---|---|---|
| 2,503,245 | Coover et al. | Apr. 11, 1950 |
| 2,588,335 | Dalton | Mar. 11, 1952 |